United States Patent
Heckerman et al.

(10) Patent No.: US 7,472,102 B1
(45) Date of Patent: *Dec. 30, 2008

(54) CLUSTER-BASED AND RULE-BASED APPROACH FOR AUTOMATED WEB-BASED TARGETED ADVERTISING WITH QUOTAS

(75) Inventors: David E. Heckerman, Bellevue, WA (US); D. Maxwell Chickering, Redmond, WA (US); Daniel Rosen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/430,767

(22) Filed: Oct. 29, 1999

(51) Int. Cl.
*G06N 5/00* (2006.01)
(52) U.S. Cl. .......................... 706/47; 706/45
(58) Field of Classification Search ............... 706/45, 706/47; 705/10, 14, 8; 707/505; 709/217; 725/116
See application file for complete search history.

(56) References Cited

U.S. PATENT DOCUMENTS

| | | | |
|---|---|---|---|
| 5,588,056 A | 12/1996 | Ganesan | |
| 5,635,978 A | 6/1997 | Alten et al. | |
| 5,848,397 A | 12/1998 | Marsh et al. | |
| 5,850,448 A | 12/1998 | Ganesan | |
| 5,864,848 A | 1/1999 | Horvitz et al. | |
| 6,026,369 A | 2/2000 | Capek | |
| 6,032,123 A * | 2/2000 | Jameson | 705/8 |
| 6,055,510 A | 4/2000 | Henrick et al. | |
| 6,128,663 A | 10/2000 | Thomas | |
| 6,134,532 A | 10/2000 | Lazarus et al. | |
| 6,182,050 B1 * | 1/2001 | Ballard | 705/14 |
| 6,286,005 B1 | 9/2001 | Cannon | |
| 6,463,585 B1 | 10/2002 | Hendricks et al. | |
| 6,665,653 B1 | 12/2003 | Heckerman et al. | |
| 6,876,974 B1 | 4/2005 | Marsh et al. | |
| 6,965,867 B1 * | 11/2005 | Jameson | 705/8 |
| 2003/0086413 A1 | 5/2003 | Tartarelli et al. | |

OTHER PUBLICATIONS

Merriam Webster's Collegiate Dictionary, Tenth Edition, 1997, p. 18.*

Patent application entitled "Method and Apparatus . . . ", U.S. Appl. No. 09/055,477, filed Apr. 6, 1998.

J. Platt, Fast Training of SVM's using Sequential Minimal Optimization, MIT Press, Baltimore, 1998.

(Continued)

*Primary Examiner*—Wilbert L Starks, Jr.
(74) *Attorney, Agent, or Firm*—Amin, Turocy & Calvin, LLP

(57) ABSTRACT

Targeted delivery of items with inventory management using a cluster-based approach or a rule-based approach is disclosed. An example of items is advertisements. Each item is allocated to one or more clusters. The allocation is made based on a predetermined criterion accounting for at least a quota for each item and possibly a constraint for each cluster. The former can refer to the number of times an item must be shown. The latter can refer to the number of times a given group of web pages is likely to be visited by users, and hence is the number of times items can be shown in a given cluster. The invention is not limited to any particular definition of what constitutes a cluster or item.

71 Claims, 8 Drawing Sheets

OTHER PUBLICATIONS

M. Sahami, S. Dumais, et al., A Bayesian Approach to Junk E-Mail Filtering, AAAI Technical Report WS-98-05, Jul. 1998.

Horvitz et al., Goal-Driven Information Interpretation and Extraction System, U.S. Pat. No. 5,864,848, Jan. 26, 1999.

R. Dedrick; "A Consumption Model for Targeted Electronic Advertising", IEEE Multimedia, Summer 1995, p. 41-49, vol. 2, No. 2.

R.R. Yager; "Targeted e-commerce marketing using fuzzy intellgent agents", IEEE Intelligent Systems, Nov.-Dec. 2000, p. 42-45, vol. 15, No. 6.

M. Charikar, et al.; "On Targeting Markov Segments", Proceedings of the Thirty-First Annual ACM Symposium on Theory of Computing, 1999, pp. 99-108.

Chickering, et al.; "Targeted Advertising with Inventory Management", EC'00, 2000, pp. 1-5.

Chickering, et al.; "A Decision Theoretic Approach to Targeted Advertising", Microsoft Research, pp. 1-7.

Chickering, et al.; "Goal-Oriented Clustering", Technical Report, May 2000, p. 1-9.

David Heckerman; "A Tutorial on Learning with Bayesian Networks", Technical Report, Mar. 1995, pp. 1-57.

M. Langheinrich, et al.; "Unintrusive Cutomization Techniques for Web Advertising", http://www8.org/w8-papers/2b-customizing/unintrusive/unintrusive.html, Viewed Nov. 28, 2000, p. 1-19.

G. Matsliach, Performance Analysis of File Organizations that Use Multi-Bucket Data Leaves with Partial Expansions, 1991, 164-180, ACM 0-89791-430-9/91/0005/0164.

* cited by examiner

US 7,472,102 B1

CLUSTER-BASED AND RULE-BASED APPROACH FOR AUTOMATED WEB-BASED TARGETED ADVERTISING WITH QUOTAS

FIELD OF THE INVENTION

This invention relates generally to targeted item delivery with inventory management, such as targeted advertising with quotas, and more specifically to a cluster-based and a rule-based approach for such targeted advertising with quotas.

BACKGROUND OF THE INVENTION

The Internet has become increasingly popular with end users, to the extent that advertisers have become attracted to this new medium. A typical type of Internet ad is known as the banner ad, which is generally displayed on the top of each web page. Operators for popular news and other sites, for example, can increase revenue by selling banner ad space to advertisers.

Frequently, advertisers choose sites to pay for banner ad space based on two criteria. First, advertisers pay to have their ads shown to specific types of people. For example, a golf store might want to have its ads shown on a sports-related page, or to people who are likely to be interested in golf based on their browsing history. Second, advertisers pay to have their ads served in such a way that they are likely to be "clicked on", so that the user will be transported to the advertiser's web site. One way to increase revenue generated from web advertising is thus to increase the "click through" rate of the ads shown; sites with higher click through rates can likely charge more to those advertisers who are interested in attracting people to their web sites. The click through rate of an ad is the percentage of times a user clicks on the ad to be transported to the advertiser's web site, against the number of times the ad is shown. Advertisers in need of advertising are thus attracted to sites that generate click through, and are usually willing to pay extra to those sites that can deliver increased click through.

One way to increase click through is by targeted advertising. Targeted advertising is the practice of showing ads to individuals based on information about them, such as their web browsing history and demographics, to increase the click through rate.

A difficulty with targeted advertising in the context of web advertising, as well as other advertising environments, is that simply showing each user the ad that will most likely be clicked will typically not be a valid approach. In particular, sites sell ad space to many different advertisers, and all of those contracts must be fulfilled regardless of the click through rates of the individual ads. Consequently, targeted-advertising approaches must explicitly take into account the number of times that each ad needs to be shown.

Targeted advertising with quotas is one type of process that is generally referred to as targeted delivery of item with inventory management. Targeted delivery of item with inventory management is generally defined as having an inventory of an item available, such that its inventory is desirably managed to produce an optimal result, such as maximum revenue. For example, in the case of targeted advertising, there is a limited number of ads that can be shown, such that the display of ads to users is desirably managed so that the "click through" rate of the ads is maximized. Another type of inventory management is product or service placement in electronic commerce contexts generally.

For these and other reasons, there is a need for the present invention.

SUMMARY OF THE INVENTION

The invention relates to a cluster-based and a rule-based approach to targeted advertising with quotas. In one embodiment, a computer-implemented method allocates each of a number of ads to one or more of a number of clusters as part of a cluster-based approach. The allocation is made based on a predetermined criterion accounting for at least a quota for each ad and a constraint for each cluster. The former in one embodiment refers to the number of times an ad must be shown. The latter in one embodiment refers to the number of times a given group of web pages—viz., a cluster—is likely to be visited by users, and hence is the number of times ads can be shown in a given cluster. The invention is not limited to any particular definition of what constitutes a cluster, however. The method selects an ad for the current cluster a user is in from the ads allocated to that cluster, and then displays the ad.

The invention therefore provides advantages not found within the prior art. The allocation of ads to clusters takes into account quotas, significantly, something that is not accomplished within the prior art. The predetermined criteria in one embodiment can be such that the click through rate for all the ads is maximized—still given the quota for each ad, as well as the constraint for each cluster. Thus, the invention allows web site operators to maximize the earning potential from advertising, by, for example, maximizing the click through rate for ads, while still meeting the quota for each ad.

In one embodiment, another constraint can be added to specify that a particular ad should not be shown within a particular cluster. This gives embodiments of the invention advantages over the prior art: certain advertisers, for example, may specify in their contract that they do not wish to advertise within certain clusters. For example, some advertisers may not wish to have their advertisements shown in adult-oriented clusters. As another example, web site operators may also not wish certain advertisements to be shown in certain clusters. For example, a web site operator may not wish to have adult-oriented advertisements shown in children-oriented clusters.

Another advantage provided by embodiments of the invention is that a user's privacy is protected while he or she is browsing the Internet. For example, in one embodiment of the invention, the ads that are shown to a user are determined by the page group of the page selected by the user for viewing, rather than on the basis of all the individual's "clicks" within a web site—that is, the specific ads that the user has already clicked on, the specific stories that the user has already clicked on, etc. In other words, the user's activity within a site is not micro-monitored in order to determine the ads to show to the user—only the user's current location in a site is monitored. This provides the user with some level of protection of his or her privacy.

The privacy of the user is further protected in one embodiment by not allocating cluster membership for ads based on information including user demographics, as can be done in other embodiments of the invention. Rather, for example, a user may be asked to fill out a questionnaire, in which the information provided therein helps determine the allocation of ads to cluster, and no other specific information about the user is provided or monitored for the allocation.

In another embodiment, as part of a rule-based approach, a computer-implemented method first applies each of at least one first item to an ordered set of rules. Each rule accounts for at least a quota for each of a plurality of second items. Application of the rules determines a second item for each first item. For example, in one embodiment, each first item includes at least information about a user, and a web page currently being browsed by the user, while each second item includes an ad. Thus, application of the rules determines a best ad for display in accordance with information about a user, and the web page currently being browsed by the user, in this example. The method then effects the second item determined for a first item, such as displaying the ad.

The invention includes computer-implemented methods, business methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
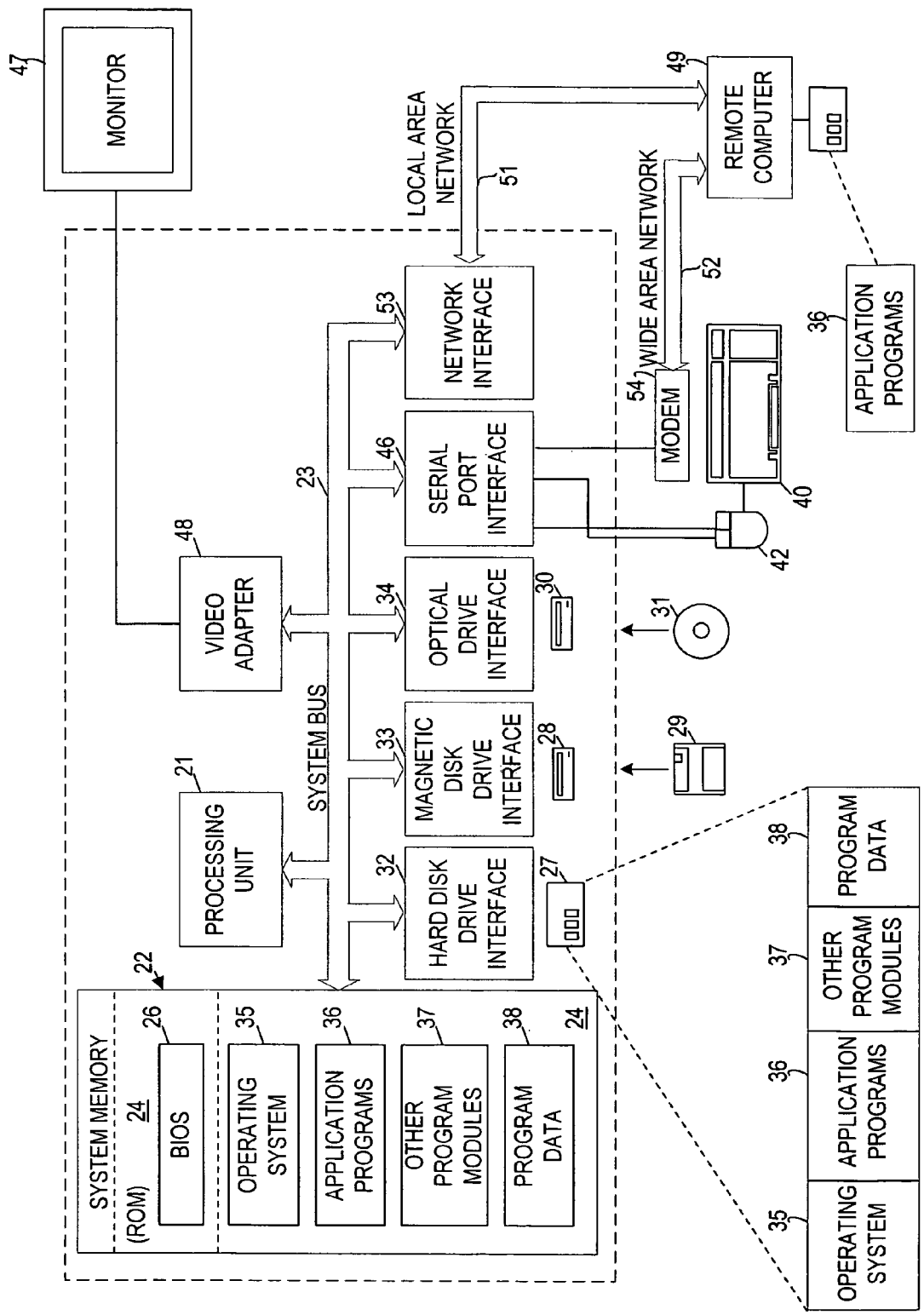
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Applications

In the detailed description, embodiments of the invention are largely described as being related to web-based targeted advertising applications in particular, and targeted advertising applications in general. However, the invention itself is not so limited. Rather, the invention is applicable to any type of commerce-related product or service placement in which an inventory of items must be managed. In the case of targeted advertising applications, the inventory to be managed is ad impressions. In other inventory management applications, the inventory to be managed can be, for example, products that need to be sold. For example, there may be a limited number of a certain kind of product to be sold, such that the use of an embodiment of the invention describes the best way in which to advertise the selling of the products.

Thus, whereas as described in the detailed description, embodiments of the invention are said to pertain to allocating ads within clusters, or determined the best ad via rules, such that a given ad can be selected and displayed, the invention itself is not so limited. Rather, the invention pertains to allocation of any item, including ads, within clusters, such that a given item can be selected and effected, where in the case of ads, effected means displayed. Besides ads, items can include products, services, etc.; the invention is not particularly limited to a particular type of item. The criteria for assigning items in clusters can include not only ad-showing quotas, but also item-purchase quotas, etc.; again, the invention is not so limited. Furthermore, the effecting of an item can mean other things besides the displaying of an ad, such as the displaying of a button on a web site for immediate purchase of an item, for example; the invention is not particularly limited to a type of effectuation for an item.

Ads and Clusters

In this section, description is provided of the relationship between ads and clusters, according to an embodiment of the invention. However, description of how clusters can be determined is provided in a subsequent section of the detailed description. The description herein is made with reference to FIGS. 2 and 3.

Figure 2:
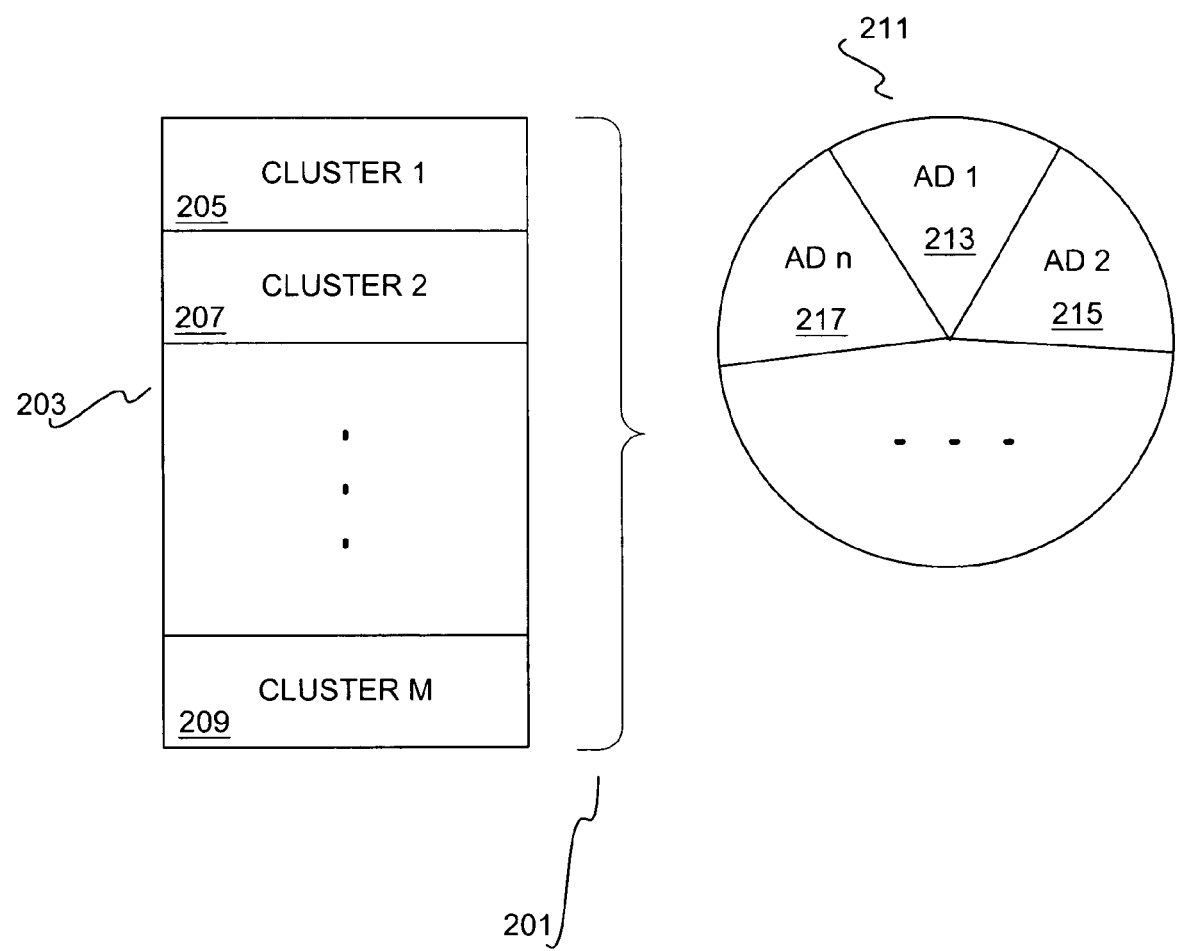
FIG. 2 is a diagram of clusters and ads, according to one embodiment of the invention.

Referring first to FIG. 2, a diagram 201 of clusters and ads is shown, according to one embodiment of the invention. There is a plurality of clusters 1 . . . m, indicated as clusters 203, where cluster 1 is shown as cluster 205, cluster 2 is shown as cluster 207, and cluster m is shown as cluster 209. For each cluster, there is click through rate associated with each of a plurality of ads 1 . . . n, indicated as ads 211, where ad 1 is shown as ad 213, ad 2 is shown as ad 215, and ad n is shown as ad 217. The click through rate for an ad i within a cluster j is the probability that a user will actuate the ad i when in cluster j. The term actuate is a generalized term, and in the context of web advertising, refers to the user clicking on the ad—such that the click through rate in such an instance is the probability that the user will click on the ad, and be transported to the advertiser's web site. In other contexts, actuate may have different meanings; for example, in another embodiment, actuate can mean the user purchasing an item. For any cluster j, each ad i thus has an associated click through rate, or probability, that is referred to as $p_{ij}$, defined as p(click on ad i|cluster j).

The manner by which $p_{ij}$ is obtained is not limited by the invention. For example, in one embodiment, a maximum likelihood approach can be used, while in another embodiment, MAP (maximum a posteriori) methods, such as using Dirichlet priors, can be used. As still another example, in one embodiment a hierarchical Bayesian approach can be used.

All of these approaches are known within the art. The approaches assume a set of training data, which provides, for example, the number of pages viewed by users in each cluster—corresponding to the number of impressions in each cluster—as well as the number and identification of ads clicked on in each cluster, and other information, such as demographical information about the users. Using any of these approaches can thus determine $p_{ij}$ for all ads and all clusters from the training data.

For example, in one embodiment, one day's worth of data from a popular large news-related web site is sufficient for learning. The data from such a web site can be organized by records, with one record for each user. The record usually will contain the ads shown to the user, information about whether the user clicked through on each of the ads, and other information about the user such as their browsing history on the site—including the page they are currently viewing—and demographical information. Once the model is learned, it is then used on one or more following days for targeted advertising. Models can then be relearned on a regular basis as desired, even using data obtained while targeted advertising was in effect.

The purpose of one embodiment of the invention is to allocate ads within each cluster so that the expected number of clicks on the entire site is maximized. The invention takes into account, however, a quota associated with each ad, which can be defined as the number of times each ad must be displayed overall within all the clusters —a typical contractual obligation that web site operators have with their advertisers. The invention can also take into account a constraint associated with each cluster, which can be defined as the number of impressions by any user associated with each cluster. That is, this constraint is the number of times a web page within a cluster is viewed by any user, and is typically a fixed value. Thus, each ad 1 . . . n has an associated quota $q_1$ . . . $q_n$, respectively, and each cluster 1 . . . m has an associated constraint $c_1$ . . . $c_m$, respectively. Each quota and constraint can be for any time duration, such as daily, weekly, etc.

Figure 3:
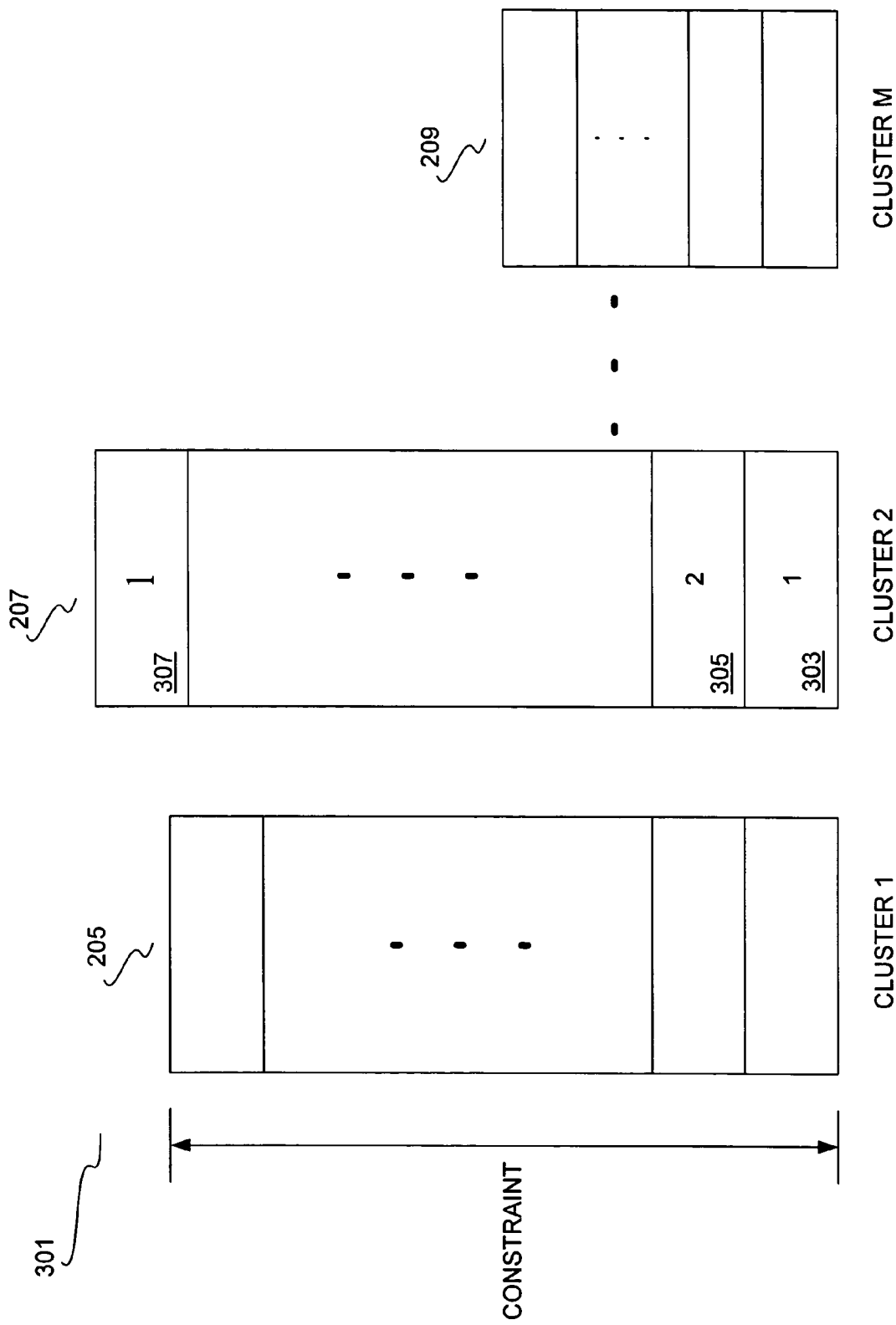
FIG. 3 is a diagram showing the allocation of ads within clusters, according to an embodiment of the invention.

Referring now to FIG. 3, a diagram 301 showing the allocation of ads within clusters is shown. Each cluster 1 . . . m, where cluster 1 is shown as the cluster 205 of FIG. 2, cluster 2 is shown as the cluster 207 of FIG. 2, and cluster m is shown as the cluster 209 of FIG. 2, has a number of slots equal to its constraint. Thus, as shown in FIG. 3, the height of a cluster is proportional to its constraint. The cluster 207, for instance, has slots 1 . . . l, where slot 1 is shown as slot 303, slot 2 is shown as slot 305, and slot l is shown as slot 307. Allocation of ads within a cluster means filling each slot with an ad, according to a predetermined criterion, to, for example, maximize the number of click throughs of the ads on the site, given the all of the clusters' constraints and the ads' quotas. That is, once the ads within a cluster are determined, the allocation is performed, and the maximization is performed globally. As determined by solving a linear program, as described in the next section of the detailed description, each ad may occupy zero or more slots of a given cluster. The manner of allocating ads is specifically described in the next section of the detailed description. Thus, once each slot of each cluster has been filled with an ad, when a user visits a web page within the cluster, an ad from that cluster is displayed. In one embodiment, the ad selected to be displayed is simply by a round-robin process through all the slots within the cluster, while in another embodiment, the ad selected to be displayed is randomly chosen from all the slots within the cluster.

Allocating Ads to Clusters

In this section, description is provided for allocating ads to clusters, according to a predetermined criterion, and accounting for a quota for each ad and a constraint for each cluster. Specifically, the predetermined criterion used herein is to maximize the number of click throughs for all of the ads, given the quotas and constraints. However, variations of the predetermined criterion are possible, and the invention is not particularly limited to maximizing click throughs. Some alternative criteria are presented in subsequent sections of the detailed description.

First, $x_{ij}$ is defined as the number of times ad i is shown in cluster j. To maximize the number of click throughs for all ads, the expression $$\sum_{ij} p_{ij} x_{ij} \qquad (1)$$

must be maximized. In one embodiment, this is subject to one or more of the constraints $$\sum_{j} x_{ij} = q_i \qquad (2)$$

and $$\sum_{i} x_{ij} = c_j, \qquad (3)$$

where the former constraint defines a quota $q_i$ for each ad i and the latter constraint defines an impressions constraint $c_j$ for each cluster j. The expressions (1) through (3) define a linear program. Those of ordinary skill within the art will recognize that this linear program may be solved by any of a variety of methods within the prior art.

In one embodiment, for example, the Simplex Algorithm, developed in the 1940's and known within the art, is used. The Simplex Algorithm is an iterative procedure for solving linear programming problems, which include finding the optimum of a linear function subject to a number of linear constraints. The Simplex Algorithm is thus a computational tool for solving linear programming problems, and is able to provide fast solutions to large-scale applications.

Solving the linear program presented above thus yields the allocation of ads within each cluster, such that the criterion is met—viz., in one embodiment the click through rate of the ads is maximized. In the next section of the detailed description, different variations are presented.

Variations

In this section of the detailed description, different variations on the allocation of ads to clusters are described. The invention is not particularly limited to a given criterion for allocating ads to clusters, however.

In one variation, a web site may wish to favor some advertisers over other advertisers. For example, the web site may receive greater revenues on a per-displayed ad or per-clicked through ad basis from a given advertiser than from other advertisers. This is accomplished by changing the expression (1) listed above to be maximized to $$\sum_{ij} \alpha_i p_{ij} x_{ij},$$

where each ad i has a corresponding coefficient $\alpha_i$ to favor or disfavor the ad relative to the other ads. For example, a non-favored/non-disfavored ad may have its coefficient equal to one, which is implied in the original expression (1). A favored ad may have a coefficient greater than one, while a disfavored ad may have a coefficient less than one.

In another variation, allocation of house ads to clusters is provided for. House ads are ads of the web site operator itself, and are typically not paid for and typically promote the web site and/or the operator, for example. House ads may be needed either because the web site operator wishes to include some of its own ads, or because the operator has not sold enough ads to cover all of the slots within all of the clusters. In such an instance, the constraint referenced as expression (3) above becomes $$\sum_i x_{ij} \le c_j$$

to indicate that not all slots within a cluster j, where there are a total number of $c_j$ slots, can be filled by non-house (i.e., paid-for) ads.

Once the linear program with this new constraint is solved, then any clusters not filled with non-house ads can be filled by house ads. The invention is not limited to the manner by which house ads fill the remainder of the empty slots in the clusters. In one embodiment, another linear program can be used to optimize the delivery of these ads, too, based on a criterion specified by the web site operator, as can be understood by those of ordinary skill within the art.

In another variation, a given ad i may either never be shown in a cluster j from an analysis of actual data perspective, or from a perspective that the web site operator and/or the advertiser may not wish the ad i to be shown in the cluster j. For example, an adult-services ad may not be desired to be shown in a children-related cluster. To accomplish this, a third constraint is added to the linear program, $x_{ij}=0$ for the ad i desired not to be shown in cluster j. This constraint specifies that the display count for ad i in cluster j is zero.

In another variation, the click through rate may be desired to be minimized instead of maximized. For example, a web site operator may receive advertiser revenue only for showing ads, and not for having users click on the ads to be transported to the advertiser's own web site. In such an instance, the operator may desire to minimize click throughs, so as to minimize the number of times users are transported away from the operator's own web site. This is accomplished by minimizing the expression (1) listed above, instead of maximizing it, in the linear program.

As can be appreciated by those of ordinary skill within the art, other variations besides those described here are also possible. For example, maximizing the actuation as has been described has been referenced as maximizing the click through rate of ads. However, other actuations are also possible. It may be desired instead to maximize purchase rates of products or services displayed in the ads, rather than click through rates. Thus, ads are displayed to users in clusters based on the maximization that a user will purchase the displayed product or service, and not just click on the ad.

As another example of possible variations, it is noted that the description of embodiments of the invention presented herein is generally in relation to a web-advertising model. However, the invention is not so limited. Other advertising models are also applicable to the invention. For example, for television ads in which goods are advertised that are orderable by a phone number presented in the ad itself, it may be desirable to maximize the actuation of these ads, where actuation can be defined as a viewer calling the number to order the product. That is, the invention is not limited to a particular domain of advertising problem sets.

Defining Clusters

In this section of the detailed description, different manners by which clusters can be defined are described. The invention is not particularly limited to any specific manner for coming up with clusters, however.

In one embodiment, an impression cluster is defined as corresponding to a particular page group of the current web page being displayed. For example, on news-related web sites, web pages are typically grouped into categories such as international news, national news, local news, weather, sports, entertainment, etc. These categories can be simply used as the clusters.

Figure 4:
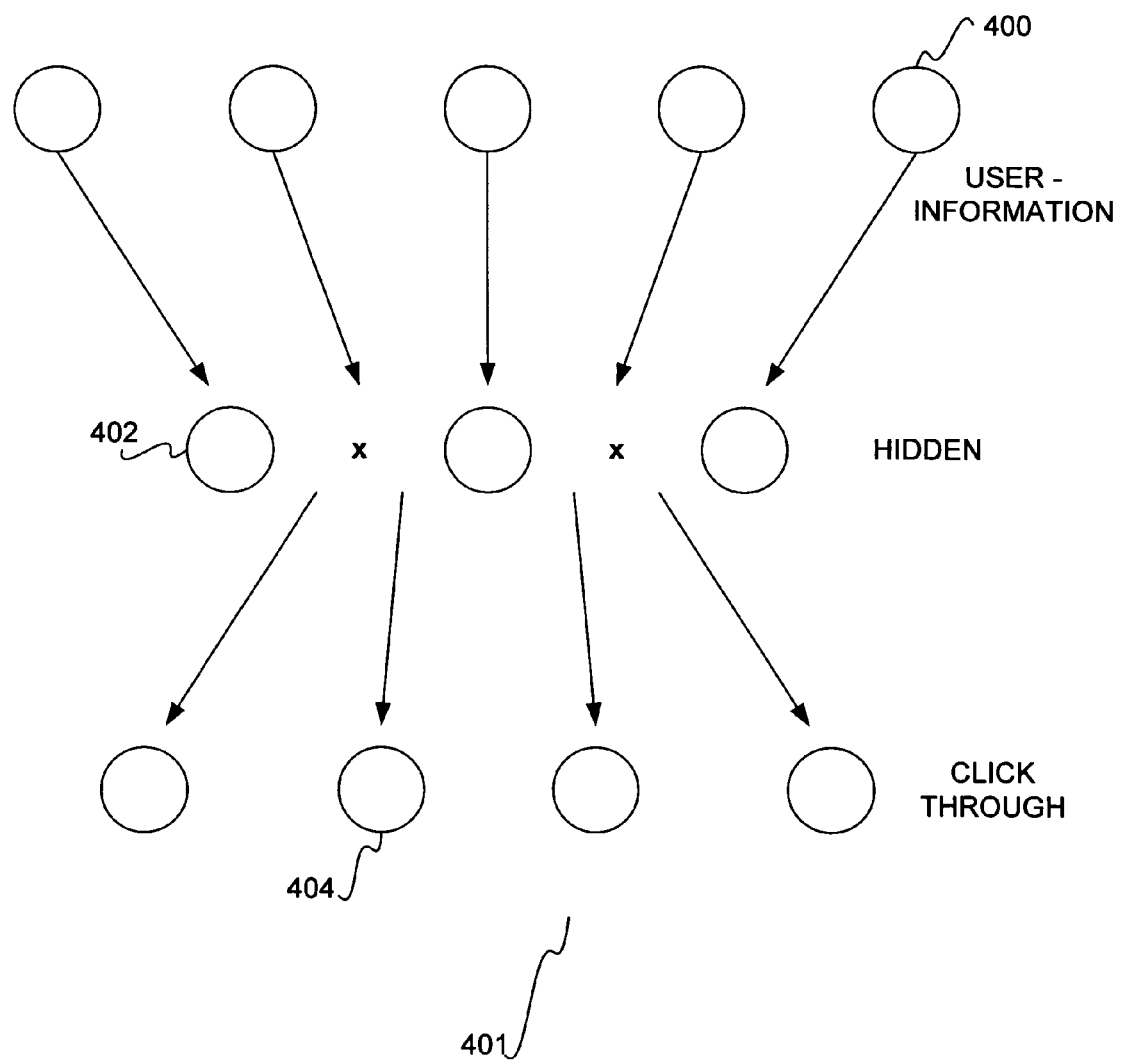
FIG. 4 is a diagram showing how a Bayesian network can be used in one embodiment to determine clusters for use with embodiments of the invention.

In another embodiment, clusters may be constructed from user information, such as browsing history and demographical information, using a naïve-Bayes-net clustering approach, as known within the art. As an alternative, a different Bayesian network architecture (which may also be called a neural-net architecture) may also be used. A typical Bayesian network model 401 for this approach is shown in the diagram of FIG. 4. The top layer of variables, such as the variable 400, corresponds to user information, and are predictive of one or more hidden variables within a middle layer of variables, such as the variable 402. The number of hidden variables within the middle layer is desirably relatively small compared to the number of user information variables within the top layer. For example, there may be between one and ten hidden variables. The hidden variables are themselves predictive of the lower layer of variables, such as the variable 404, which correspond to whether or not the user clicks through on the ads shown to him or her.

There are at least two specific instances of the architecture that can be used. In one instance, there is a single hidden variable with k values. In the other instance, there are several (l) hidden variables, each with 2 values. The model 401 of FIG. 4 is sometimes referred to in the art as a bottleneck architecture, since one or more hidden variables are used to summarize a much larger number of user-information variables to predict ad click throughs (or other actuations). Those of ordinary skill within the art will recognize that the model can be trained with a variety of techniques known within the art, such as the stochastic gradient descent technique known within the art. Furthermore, they will recognize that the number of states k may (in a first instance of the architecture) and the number of variables l (in a second instance of the architecture) be determined by trying different values for k or l, and noting whether click through (or whatever criterion used) increases for a given test set having a given value for k or l.

An alternative method constructs clusters hierarchically, using a series of bottleneck architectures. First, a bottleneck architecture is created such that the upper layer is as described before and the lower layer contain abstractions of the targets described before. For example, the initial bottleneck architecture may be used such that the lower layer of (abstracted) variables includes "car ads", "drugstore ads", "book-store ads", "florist ads". Once this bottleneck architecture has been used to construct clusters, the data is segmented by these clusters and each segment is recursively subjected to clustering using another bottleneck architecture in which the upper layer is as described before and the lower layer contains less abstract abstractions than in the initial bottleneck architecture. For example, the lower layer of a bottleneck architecture that refines the cluster corresponding to "car ads" may include the variables "BMW ads", "Toyota ads", and "Ford ads". When it comes time to show an ad, the system would first determine what high level cluster the user is in using the initial bottleneck architecture. If processing time is limited, the ad could be shown based on this cluster alone. However, if additional processing time is available, the second level bottleneck architecture corresponding to the top level cluster of the user can be used to determine the second level cluster of the user, and the ad shown could be based on this second-level cluster.

In another embodiment, a text classifier is used to group web pages by the text contained within those web pages. The desired number of groups is not limited—for example, there may be about twenty groups. Each group corresponds to a cluster. Text classifiers are known within the art. The text classification methodology may employ different phases of analysis, including feature selection, classifier construction, and mapping classifier outputs to actuations of ads by users.

In one embodiment, the text classification methodology is based on a Bayesian learning approach, as described in the reference M. Sahami, S. Dumais, D. Heckerman, E. Horvitz, A Bayesian Approach to Junk E-Mail Filtering, AAAI Workshop on Text Classification, July 1998, Madison, Wis., AAAI Technical Report WS-98-05. In other embodiments, the text classification methodology is based on a linear Support Vector Machine methodology, as described in the following references: the coassigned patent, U.S. Pat. No. 5,864,848, issued Jan. 26, 1999, which is hereby incorporated by reference; the previously filed and coassigned case entitled "METHODS AND APPARATUS FOR BUILDING A SUPPORT VECTOR MACHINE CLASSIFIER," Ser. No. 09/055,477, filed on Apr. 6, 1998; and, the reference J. Platt, Fast Training of Support Vector Machines using Sequential Minimal Optimization, MIT Press, Baltimore, Md., 1998.

Thus far, it has been implicitly assumed that the information used to determine the clusters for assignment of ads therein includes at least some information that is web-related. Such web-related information may include, for example, previous activity of users on a given web site. However, the invention is not so limited. Clusters can be determined, and ads assigned therein, based on any information, including that which is not web-related at all. For example, credit card information, indicating users' propensity of spending on certain items, may instead be used to define clusters. The invention is not limited to a particular type or kind of information to define clusters.

In another embodiment of the invention, previous user activity in clusters and/or user demographic information that may be obtainable from external sources is not used at all to define the clusters. Rather, the user is provided the opportunity to fill out a questionnaire, with the benefit that the user's privacy will be protected in that his or her activity on the web site will not be monitored at all, and/or other information regarding the user will not be sought. Then, based on this questionnaire, clusters can be defined. This embodiment has the advantage of protecting user privacy, and also eliminates the need for a user activity monitoring infrastructure on the server side of a web site, rendering web site development easier. The questionnaire may be constructed using prior knowledge alone, or by showing an expert the clusters formed using a bottleneck architecture applied to a sample of data that includes user activity, demographics, etc.

It is noted that cluster definition gives an a priori look at qualified customers that can then be used when approaching advertisers. That is, the cluster analysis provides a priori the best group of users who would view a predetermined ad. This means that advertisers can then be approached with the information that a web site operator can provide a predetermined reception of ads, without the users having yet actually been exposed to the ads. Thus, the web site operator can determine a price differential to charge different advertisers different advertising rates, based on the a priori predetermined reception of users to different advertisers' ads. Each cluster corresponds to a group of users most receptive to a given type of ad. An ad of a particular type is then allocated to the one or more clusters that will provide the ad greatest exposure, or based on some other predetermined criterion.

Cluster-Based Approach

Figure 5:
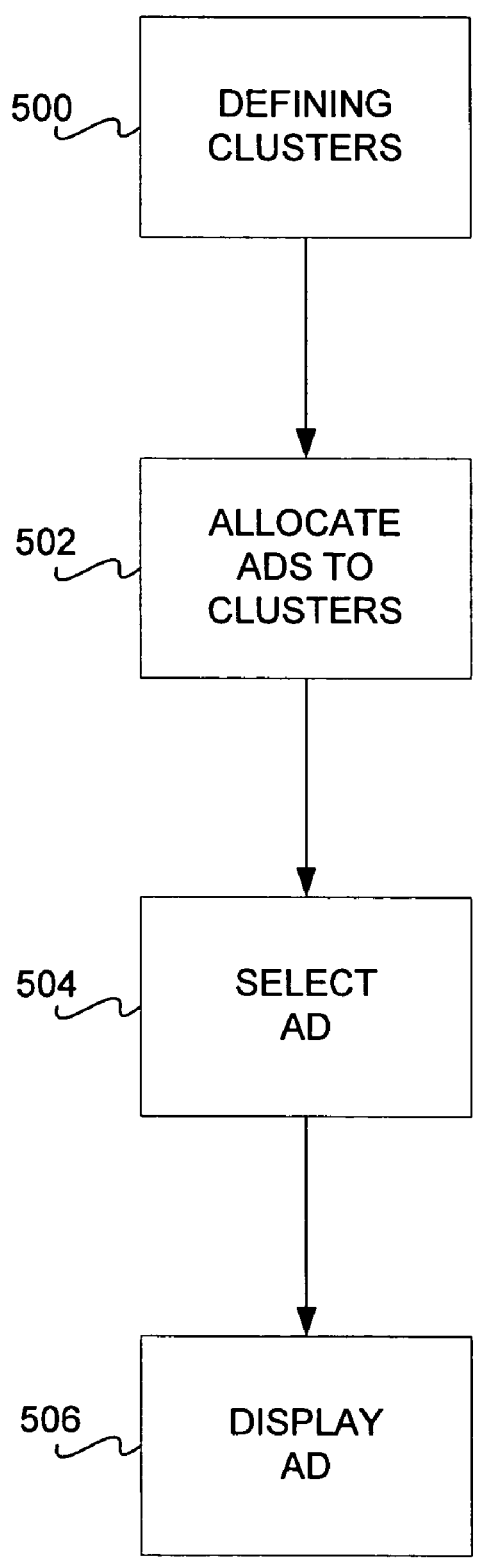
FIG. 5 is a flowchart of a method according to an embodiment of the invention.

In this section of the detailed description, description of methods and systems according to varying cluster-based approach embodiments of the invention is presented. The method is particularly described in conjunction with FIG. 5, which is a flowchart of a method according to differing embodiments. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

In 500, a plurality of clusters is first defined. The plurality of clusters is defined in one embodiment as described in a previous section of the detailed description. For example, a preexisting plurality of groups can be used as the plurality of clusters, or the clusters may be determined by approaches such as utilizing a Bayesian network with one or more hidden nodes. The invention is not so limited.

In 502, each of a plurality of ads is allocated to one or more of the clusters, based on a predetermined criterion accounting for a quota for each ad and/or a constraint for each cluster. The allocation is performed in one embodiment as described in a previous section of the detailed description. For example, the expression (1) listed above can be maximized, subject to the constraints of the expressions (2) and (3) also listed above, by solving a linear program using the Simplex Algorithm. Allocation is performed in one embodiment by initially determining for each ad in each cluster a probability that a user in the cluster will actuate the ad if displayed—that is, click on the ad, etc. This initial determination can be made from training data that is inputted, and utilizing a technique such as a maximum likelihood approach, a MAP method approach, or a hierarchical Bayesian approach, as has been described.

As has also been described, the predetermined criterion is not limited to the expressions (1) through (3) listed above, but can be varied as well. For example, one or more ads can be favored, and one or more house ads can also be accounted for. As another example, the expression (1) can be minimized instead of maximized, and actuation can be used to refer to something other than click through, as has been described. In one embodiment, following 502, the allocation of each ad to at least one of the plurality of clusters is then output, which is not explicitly shown in FIG. 5. Outputting may include displaying or printing for review the ad allocation to the clusters, for example; the invention is not so limited.

In 504, an ad for a current cluster in which a user is in is selected from the ads allocated to that cluster. As has been described, this can be accomplished by randomly selecting an ad from those allocated to the slots of the cluster, or going round robin through all the slots of that cluster. Finally, in 506, the ad is displayed on the web page that the user has selected for viewing.

It is noted that as has been described thus far in the application, embodiments of the invention are in relation to a computer implementation. However, the invention is also applicable to and encompasses business methods, as well as other methods, for example. Thus, a business method can incorporate one or more of the following: defining clusters as has been described; allocating ads to clusters as has been described; and, selecting an ad for display, as has been described. The invention itself is particularly delineated by the claims appended to the end of this detailed description, as those of ordinary skill within the art can appreciate.

Figure 6:
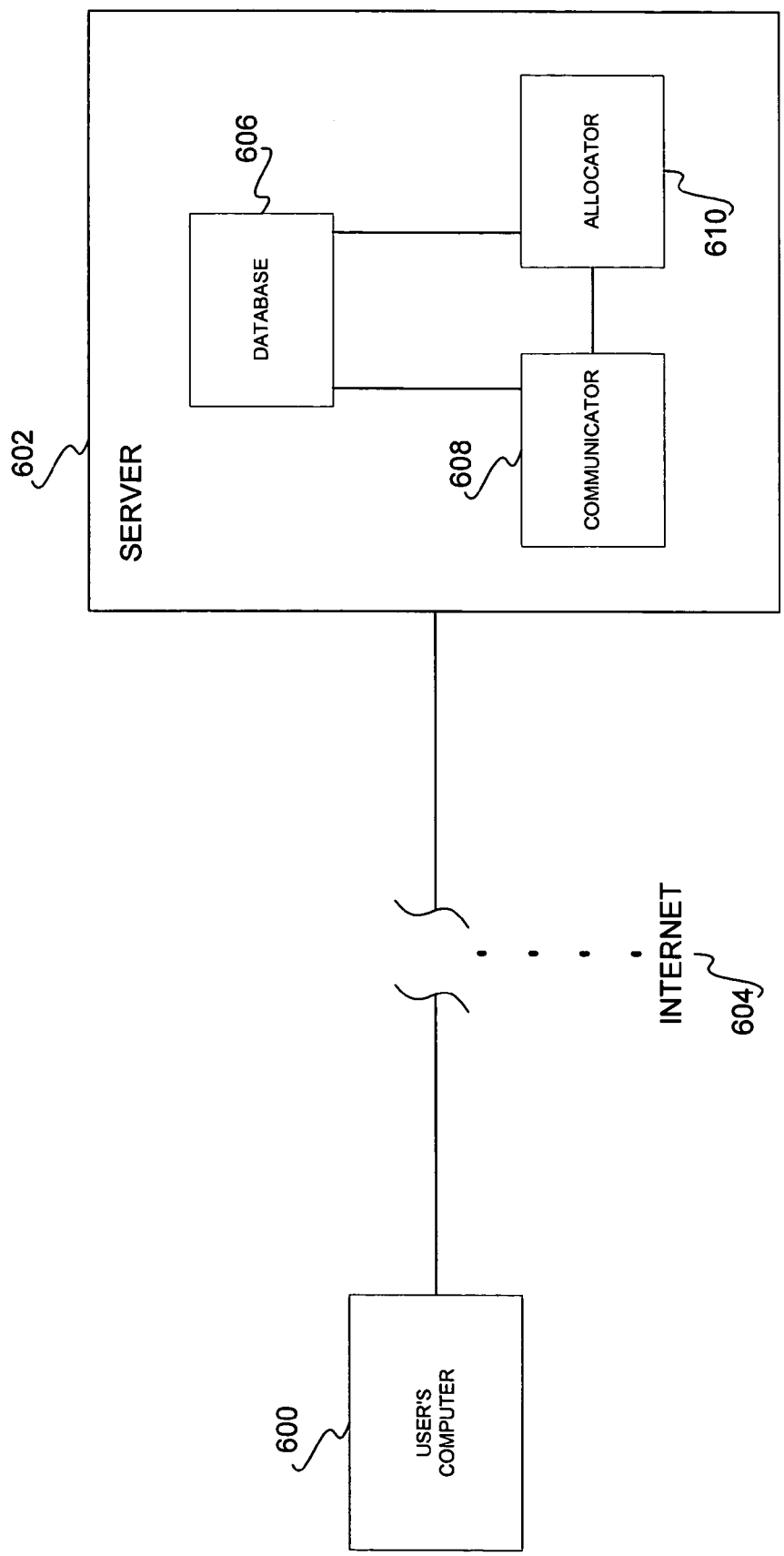
FIG. 6 is a diagram of a system according to an embodiment of the invention.

Next, a description of a system according to an embodiment of the invention is provided. The description is made with reference to FIG. 6. Referring now to FIG. 6, the system thereof includes a user's computer 600 and a server 602. The user's computer 600 is communicatively coupled to the server 602—as shown in FIG. 6, specifically through the Internet 604, as known within the art. A user thus uses the computer 600 in one embodiment to request a particular web page, which the server 602 returns to the user for viewing on the computer 600. The web page includes a targeted banner ad, determined and selected in accordance with embodiments of the invention as has been described. In one embodiment, either the computer 600 and/or the server 602 comprises a computer as has been described in the section of the detailed description describing FIG. 1, above.

The server 602 includes a database 606, a communicator 608, and an allocator 610. The database 606 stores a plurality of ads, where each ad has an associated quota. The allocator 610 allocates each of the plurality of ads to at least one of a plurality of clusters, based on a predetermined criterion accounting for at least the quota for each ad and a constraint for each cluster, as has been described. The communicator 608 selects an ad for a current cluster from ads allocated to the current cluster, and outputs the ad to the user as described in the preceding paragraph—for example, for viewing in conjunction with a particular web page categorized in the current cluster.

In one embodiment, the database 606 is stored as data on a computer-readable medium such as a memory or a hard disk drive. Furthermore, in one embodiment, the allocator 610 and/or the communicator 608 includes a computer program executed from a computer-readable medium by a processor. Each of the allocator 610 and the communicator 608 may also be one or more software components or objects of a computer program, one or more parts of a computer programs, or may be implemented as one or more computer programs. The invention is not so limited.

Rule-Based Approach

In this section of the detailed description, a rule-based approach for inventory management is described. Computer-implemented methods according to varying rule-based approach embodiments are particularly described. The computer-implemented methods are desirably realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer.

An example of what is meant by a rule-based approach according to one embodiment of the invention is first described. A rule-based approach uses an ordered set of rules, where each rule accounts for at least a quota for a given ad. An example of an ordered rule set is:

If user is male and quota for ad 5 is not yet reached, then show ad 5

Else if user is >50 years old and quota for ad 17 is not yet reached, then show ad 17

Else if user has been to the weather web page and quota for ad 3 is not yet reached, then show ad 3

Else show

Ad 1 with probability 0.132

Ad 2 with probability 0.003

. . .

Ad n with probability 0.014

It is noted that the rules are ordered. In the example, a user who is both male and greater than fifty years old would not see ad 17, for instance, unless the quota for ad 5 has already been exceeded.

Figure 7:
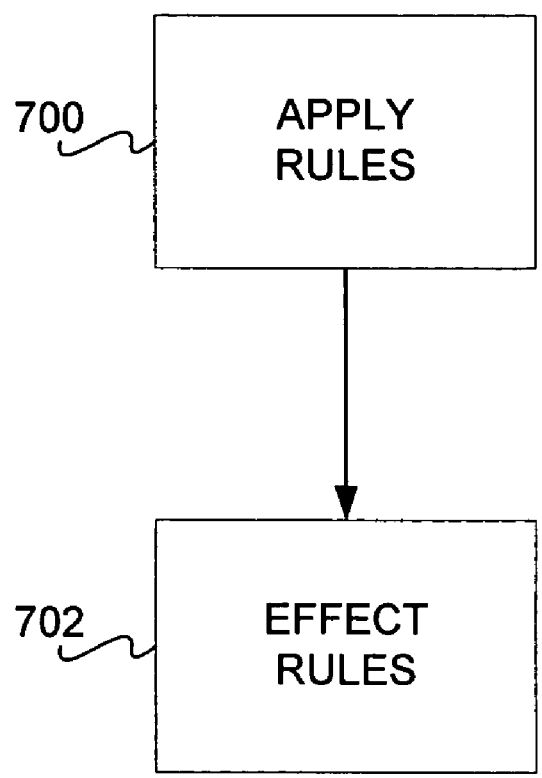
FIG. 7 is a flowchart of a method according to another embodiment of the invention; and, FIG. 8 is a flowchart of a method to generate an ordered set of rules according to an embodiment of the invention.

A method for implementing a rule-based approach, according to one embodiment of the invention, is shown in the flowchart of FIG. 7. In 700, each of one or more first items is applied to an ordered set of rules. The invention is not limited to what constitutes a first item. For example, in one embodiment, a first item may include information about a user, such as demographic information, the web pages already browsed by the user, and the web page that the user is currently browsing. Each rule accounts for at least a quota for each of a number of second items. Again, the invention is not limited to what constitutes a second item. For example, in one embodiment, a second item may be an ad that is to be displayed at least a number of times (i.e., the ad's quota) on web pages being browsed by users. Application of the rules thus determines a second item for each first item. Furthermore, what is referred to as an activation of a second item is not limited by the invention. In the case where the second items are ads on web pages, for instance, a user clicking on the ad such that a web page linked to that ad is displayed, known as click-through within the art, can constitute activation, while in the case where the second items are products to be purchased, purchase of a product can constitute activation.

Next, in 702, the second item for each first item is effected. As has been described, the term effected can in the context of ads mean displaying the ad. Furthermore, the effecting of an item can mean other things besides the displaying of an ad, such as the displaying of a button on a web site for immediate purchase of an item, for example; the invention is not particularly limited to a type of effectuation for an item.

Figure 8:
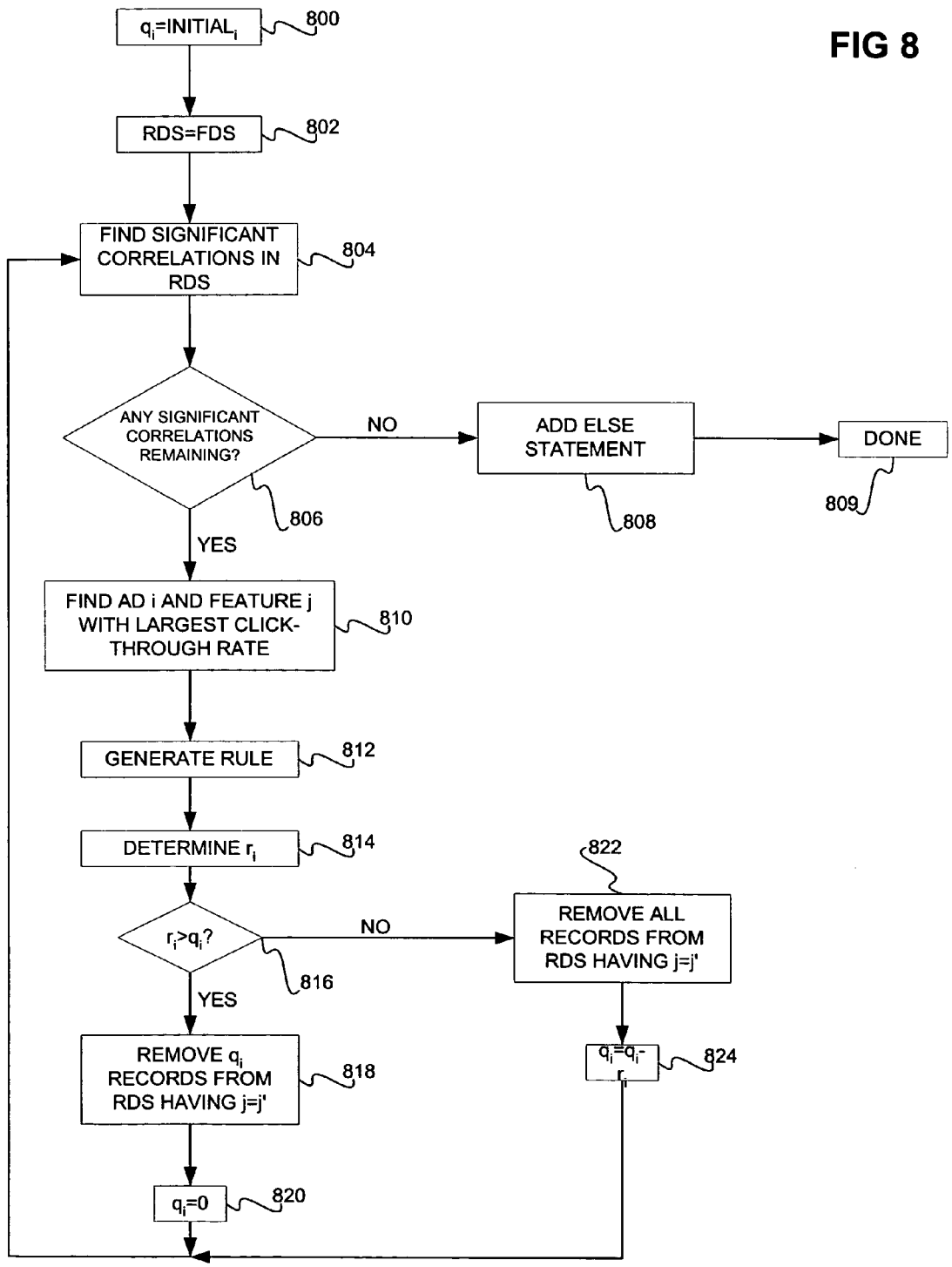

The method of FIG. 7 can in one embodiment also include the initial part of generating the ordered set of rules, based on training data (not specifically shown in FIG. 7). The manner by which the ordered set of rules are generated is not limited by the invention, but in one embodiment, generation is accomplished as is now described in conjunction with FIG. 8, which is a flowchart of a method according to an embodiment of the invention. It is noted that the method of FIG. 8 assumes that the features of each first item (i.e., the specific pieces of information that make up the first item, such as user sex, user age, etc.) are binary, that is, can be expressed as either "yes" or "no," "true" or "false," etc. Those of ordinary skill within the art recognize that any non-binary feature can be divided into a collection of binary features, however, such that the method of FIG. 8 is not limited to features initially presented as non-binary. The description of FIG. 8 is presented in terms of ads as the second items; however, as indicated, the invention is itself not so limited.

Referring now to FIG. 8, in 800, a remaining quota $q_i$ for each ad i is initialized as the quota initially set for that ad, for example, by the advertiser contracting for advertising on the web site (referred to as initials in FIG. 8). In 802, the remaining data set (RDS) is initialized as the full training data set (FDS). The set of training data is the data used to generate the rules. The training data set provides, for example, the number of pages viewed by users, as well as the number and identification of ads clicked on in each cluster, and other information, such as demographical information about the users. For example, in one embodiment, one day's worth of data from a popular large news-related web site is sufficient for learning. The data from such a web site can be organized by records, with one record for each user. The record usually will contain the ads shown to the user, information about whether the user clicked through on each of the ads, and other information about the user such as their browsing history on the site, including the page they are currently viewing, and demographical information.

In 804, significant correlations between features of the records and ad click-through rates, or other activation rates, are determined in the remaining data set. A feature of the record can be likened as a field of the record. For example, because each feature is described as binary, one example feature may be, "is the user male," while another feature may be "did the user ever visit the web site www.acme-co.com." Thus, the information contained in a record can be described as a set of features for that record. Significant correlations are found in 804 by statistical methods known within the art. Such methods include the Chi-squared method, the Fisher exact test, and Bayesian model selection. The invention is not so limited, however.

If there is at least one significant correlation, then the method proceeds from 806 to 810; otherwise, the method proceeds from 806 to 808, as is described later in this section. In 810, the ad i and feature j combination having the largest estimated click-through rate, or other activation, is found. Next, in 812, a rule is generated and added to the list of ordered rules. First, the binary value j' of the feature j that increases the click-through rate on ad i is determined. The rule is then generated as "if feature j=value j' and the quota for ad i is not yet met, then show ad i." For every rule except the first rule generated, this statement is proceeded by the word "else," such that the ordered list of rules generated is of the form "if a then b, else if c then d," etc.

Next, records that satisfy this rule are removed from the remaining data set, as follows. Beginning in 814, $r_i$ is determined as the number of records in the remaining data set where feature j equals value j'. In 816, if $r_i$ is greater than $q_i$, the latter being the quota for the ad i, then in 818, $q_i$ records are removed from the remaining data set, at random, where each of the records removed has feature j equal to value j', and, in 820, $q_i$ is set to zero. If in 816 $r_i$ is not greater than $q_i$, then, instead, in 822, all records from the remaining data set having feature j equal to value j' are removed, and, in 824, $q_i$ is decreased by $r_i$. From either 820 or 824, the method proceeds back to 804, and the process to generate rules is repeated until no more significant correlations can be found in the remaining data set.

Once no significant correlations are found in the remaining data set, then, in 808, a final "else show" clause is added to the ordered list of rules. For every ad where $q_i$ does not equal zero—that is, for each ad having a quota that has not been set to and/or decremented to zero as a result of the operations in 820 and 824—a clause is added to the else statement of the form $$\text{"ad } i \text{ with probability } \frac{q_i}{q}, \text{ where } q = \sum_i q_i \text{."}$$

Thus, the final clause generated in 808 is of the form "else show a with probability b, c with probability d," etc. The method is then complete in 809.

As has already been noted, the description provided of this rule-based approach has been made with particular reference to ads having click-through rates. However, the invention itself is not so limited. Thus, other items besides ads can have their inventories managed per the rule-based approach presented in this section of the detailed description, having other criteria besides largest click-through rates dictating the generation and ordering of rules. For example, products can be managed, where highest purchase rate dictates the generation and ordering of rules. Furthermore, it is reminded that where the ads described herein can be generalized as items, their click-through rates can be generalized as activations.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
  allocating each of a plurality of ads to at least one of a plurality of clusters, based on a predetermined criterion accounting for at least a quota for each ad and a constraint for each cluster;
  selecting an ad for a current cluster from ads allocated to the current cluster; and
  effecting the ad, the predetermined criterion increases an actuation occurrence of the effected ad.

2. The method of claim 1, effecting the ad comprises displaying the ad.

3. The method of claim 2, the predetermined criterion further accounts for a particular one of the plurality of ads restricted from being shown in a particular one or more of the plurality of clusters.

4. The method of claim 2, the predetermined criterion comprises maximizing an expression $$\sum_{ij} p_{ij} x_{ij},$$

were $p_{ij}$ comprises a probability that a user in cluster j will actuate ad i.

5. The method of claim 4, the predetermined criterion further comprises maximizing the expression subject to a constraint $$\sum_j x_{ij} = q_i,$$

where $q_i$ comprises a quota for ad i, and $x_{ij}$ comprises a total number of times ad i is shown in cluster j.

6. The method of claim 4, the predetermined criterion further comprises maximizing the expression subject to a constraint $$\sum_i x_{ij} = c_j,$$

where $c_j$, comprises a constraint for cluster j, and $x_{ij}$ comprises a total number of times ad i is shown in cluster j.

7. The method of claim 4, the predetermined criterion comprises maximizing the expression subject to a first constraint $$\sum_j x_{ij} = q_i,$$

where $q_i$ comprises a quota for ad i, and $x_{ij}$ comprises a total number of times ad i is shown in cluster j, and a second constraint $$\sum_i x_{ij} = c_j,$$

where $c_j$ comprises a constraint for cluster j, and $x_{ij}$ comprises a total number of times ad i is shown in cluster j, such that the expression, the first constraint and the second constraint define a linear program.

8. The method of claim 7, the linear program is solved by the Simplex Algorithm.

9. The method of claim 2, allocating each of a plurality of ads to at least one of the plurality of clusters comprises determining for each ad in each cluster a probability that a user in the cluster will actuate the ad.

10. The method of claim 9, the probability that a user in the cluster will actuate the ad comprises the probability that a user in the cluster will click on the ad.

11. The method of claim 9, determining for each ad in each cluster a probability that a user in the cluster will actuate the ad comprises inputting training data from which to determine for each ad in each cluster the probability that a user in the cluster will actuate the ad.

12. The method of claim 9, determining for each ad in each cluster a probability that a user in the cluster will actuate the ad comprises utilizing at least one of: a maximum likelihood approach, a MAP method approach, and, a hierarchical Bayesian approach.

13. The method of claim 2, the predetermined criterion comprises maximizing an expected number of actuations of the plurality of ads, given the quota for each ad and the constraint for each cluster.

14. The method of claim 2, the constraint for each cluster comprises a total number of times the cluster is visited by any user.

15. The method of claim 2, the quota for each ad comprises a total number of times that the ad must be displayed.

16. The method of claim 2, the criterion comprises favoring at least one ad over other ads within the plurality of ads in allocating the at least one ad.

17. The method of claim 2, the criterion comprises accounting for at least one house ad.

18. The method of claim 2, the predetermined criterion comprises minimizing an expression $$\sum_{ij} p_{ij} x_{ij},$$

where $p_{ij}$ comprises a probability that a user in cluster j will actuate ad i.

19. The method of claim 2, the predetermined criterion comprises maximizing an expression $$\sum_{ij} \alpha_i p_{ij} x_{ij},$$

where $p_{ij}$ comprises a probability that a user in cluster j will actuate ad i, and $\alpha_i$ comprises a coefficient for the ad i to indicate weighting of the ad i.

20. The method of claim 4, the predetermined criterion further comprises maximizing the expression subject to a constraint $x_{ij}=0$ for a particular ad i within a particular cluster j, where $x_{ij}$ comprises a total number of times the ad i is shown in the cluster j.

21. The method of claim 4, the predetermined criterion further comprises maximizing the expression subject to a constraint $$\sum_i x_{ij} \leq c_j,$$

where $c_j$ comprises a constraint for cluster j, and $x_{ij}$ comprises a total number of times ad i is shown in cluster j.

22. The method of claim 9, the probability that a user in the cluster will actuate the ad comprises the probability that a user in the cluster will make a purchase based on the ad.

23. The method of claim 2, the method includes first initially defining the plurality of clusters.

24. The method of claim 23, defining the plurality of clusters comprises utilizing user information obtained without monitoring.

25. The method of claim 23, utilizing user information obtained without monitoring comprises utilizing a category tag (e.g., page group) of the page on which the ad is to be displayed.

26. The method of claim 24, utilizing user information obtained without monitoring comprises utilizing user information obtained from the user via a questionnaire.

27. The method of claim 23, defining the plurality of clusters comprises utilizing a preexisting plurality of groups as the plurality of clusters.

28. The method of claim 23, defining the plurality of clusters comprises utilizing a Bayesian network.

29. The method of claim 23, defining the plurality of clusters comprises utilizing a naïve-Bayes-network clustering approach.

30. The method of claim 29, utilizing a Bayesian network clustering approach comprises utilizing a bottleneck architecture.

31. The method of claim 29, utilizing a Bayesian network clustering approach comprises utilizing a bottleneck architecture recursively to construct a hierarchy of clusters.

32. The method of claim 29, utilizing a Bayesian network clustering approach comprises training a Bayesian network using a stochastic gradient descent technique.

33. The method of claim 29, utilizing a Bayesian network clustering approach comprises employing a single hidden variable having a plurality of values.

34. The method of claim 29, utilizing a Bayesian network clustering approach comprises employing a plurality of hidden variables, each having two values.

35. A computer-implemented method comprising:
defining a plurality of clusters, each cluster corresponding to a group of users who are most receptive to a given type of ad, defining the plurality of clusters comprises utilizing one of:
user information obtained without monitoring;
a Bayesian network; or
a naïve-Bayes-network clustering approach;
allocating an ad having a particular type to at least one cluster based on the particular type of the ad and based on a predetermined criterion to maximize the number of click throughs of the allocated ad; and
outputting the allocated ad to the group of users.

36. The method of claim 35, utilizing user information obtained without monitoring comprises utilizing user information obtained from the user via a questionnaire.

37. The method of claim 35, utilizing a Bayesian network clustering approach comprises utilizing a bottleneck architecture.

38. The method of claim 35, utilizing a Bayesian network clustering approach comprises utilizing a hierarchical bottleneck architecture.

39. The method of claim 35, utilizing a Bayesian network clustering approach comprises training a Bayesian network using a stochastic gradient descent technique.

40. The method of claim 35, utilizing a Bayesian network clustering approach comprises employing a single hidden variable having a plurality of values.

41. The method of claim 35, utilizing a Bayesian network clustering approach comprises employing a plurality of hidden variables, each having two values.

42. A computer-implemented method comprising:
determining an allocation for each of a plurality of ads to at least one of a plurality of clusters, given a constraint $$\sum_j x_{ij} = q_i,$$

where $q_i$ comprises a quota for ad i, and $x_{ij}$ comprises a total number of times ad i is shown in cluster j; and
outputting the allocation of each ad to at least one of the plurality of clusters, the allocation provides a preference to at least one of the plurality of ads.

43. The method of claim 42, determining an allocation for each of a plurality of ads to at least one of the plurality of clusters comprises maximizing an expression $$\sum_{ij} p_{ij} x_{ij},$$

where $p_{ij}$ comprises a probability that a user in cluster j will actuate ad i, given the constraint.

44. The method of claim 42, determining an allocation for each of a plurality of ads to at least one of the plurality of clusters comprises determining the allocation for each of the plurality of ads to at least one of the plurality of clusters further given a constraint $$\sum_i x_{ij} = c_j,$$

where $c_j$ comprises a constraint for cluster j, and $x_{ij}$ comprises a total number of times ad i is shown in cluster j.

45. The method of claim 42, further comprising:
selecting an ad for a current cluster from the allocation of each ad to the current cluster; and,
displaying the ad.

46. A computerized system comprising:
a database storing a plurality of ads, each ad having an item purchase quota;
an allocator to allocate each of the plurality of ads to at least one of a plurality of clusters, based on a predetermined criterion accounting for at least the item purchase quota for each ad and a constraint for each cluster; and,
a communicator to select an ad for a current cluster from ads allocated to the current cluster and output the ad to a user.

47. The system of claim 46, at least one of the allocator and the communicator comprises a computer program executed from a computer-readable medium by a processor.

48. The system of claim 46, the database is stored as data on a computer-readable medium.

49. A machine-readable medium having instructions stored thereon for execution by a processor to perform a method comprising:
allocating each of a plurality of ads to at least one of a plurality of clusters, based on a predetermined criterion accounting for at least a quota for each ad and a constraint for each cluster, the quota for each ad is an ad display quota;
selecting an ad for a current cluster from ads allocated to the current cluster; and
displaying the ad to achieve the ad display quota.

50. The medium of claim 49, the predetermined criterion comprises maximizing an expression $$\sum_{ij} p_{ij} x_{ij},$$

where $p_{ij}$ comprises a probability that a user in cluster j will actuate ad I.

51. The medium of claim 50, the predetermined criterion further comprises maximizing the expression subject to a constraint $$\sum_j x_{ij} = q_i,$$

where $q_i$ comprises a quota for ad i, and $x_{ij}$ comprises a total number of times ad i is shown in cluster j.

52. The medium of claim 50, the predetermined criterion further comprises maximizing the expression subject to a constraint $$\sum_i x_{ij} = c_j,$$

where $c_j$ comprises a constraint for cluster j, and $x_{ij}$ comprises a total number of times ad i is shown in cluster j.

53. The medium of claim 49, allocating each of a plurality of ads to at least one of the plurality of clusters comprises determining for each ad in each cluster a probability that a user in the cluster will actuate the ad.

54. The medium of claim 49, the predetermined criterion comprises maximizing an expected number of actuations of the plurality of ads, given the quota for each ad and the constraint for each cluster.

55. A machine-readable medium having instructions stored thereon for execution by a processor to perform a method comprising:
   determining an allocation for each of a plurality of ads to at least one of a plurality of clusters, given a constraint $$\sum_j x_{ij} = q_i,$$

where $q_i$ comprises a quota for ad i, and $x_{ij}$ comprises a total number of times ad i is shown in cluster j; and
   outputting the allocation of each ad to at least one of the plurality of clusters, the allocation provides a preference to at least one of the plurality of ads.

56. The medium of claim 55, determining an allocation for each of a plurality of ads to at least one of the plurality of clusters comprises maximizing an expression $$\sum_{ij} p_{ij} x_{ij},$$

where $p_{ij}$ comprises a probability that a user in cluster j will actuate ad i, given the constraint.

57. The medium of claim 55, determining an allocation for each of a plurality of ads to at least one of the plurality of clusters comprises determining the allocation for each of the plurality of ads to at least one of the plurality of clusters further given a constraint $$\sum_i x_{ij} = c_j,$$

where $c_j$ comprises a constraint for cluster j, and $x_{ij}$ comprises a total number of times ad i is shown in cluster j.

58. A computer-implemented method comprising:
   applying each of at least one first item to an ordered set of rules, each rule accounting for a click-through rate quota for each of a plurality of ads, to determine an ad for each of the at least one first item; and
   effecting the ad for each of the at least one first item to achieve the click-through rate quota.

59. The method of claim 58, each first item comprises at least information about a user, and a web page currently being browsed by the user.

60. The method of claim 58, effecting the ad comprises displaying the ad.

61. The method of claim 58, further comprising generating the ordered set of rules based on training data.

62. The method of claim 61, generating the ordered set of rules comprises:
   determining at least one significant correlation between a plurality of binary features of the training data and a plurality of activations of ads of the training data;
   determining an ad and at least one binary feature providing a largest activation; and,
   generating a rule based on the ad and the at least one binary feature providing the largest activation.

63. The method of claim 62, generating the ordered set of rules further comprises:
   removing records from the training data matching the rule generated; and,
   repeating to generate another, lower-ordered rule while at least one significant correlation still exists.

64. The method of claim 62, determining at least one significant correlation comprises utilizing one of: Chi-squared method, Fisher exact test method, and Bayesian model selection method.

65. A computer-implemented method for inventory management comprising:
   determining at least one significant correlation between a plurality of binary features of training data and a plurality of activation of items from the training data;
   determining an ad and at least one binary feature providing a largest activation, each rule accounting for at least a quota for the item;
   generating a rule based on the ad and the at least one binary feature providing the largest activation;
   removing records from the training data matching the rule generated; and
   repeating to generate another, lower-ordered rule while at least one significant correlation still exists.

66. The method of claim 65, each ad comprises an ad.

67. A machine-readable medium having instructions stored thereon for execution by a processor to perform a method comprising:
   applying each of at least one first item to an ordered set of rules, each rule accounting for at least a quota for each of a plurality of second items, to determine a second item for each of the at least one first item; and,
   effecting the second item for each of the at least one first item.

68. The medium of claim 67, the method further comprising generating the ordered set of rules based on training data.

69. The medium of claim 67, each first item comprises at least information about a user, and a web page currently being browsed by the user, and each second item comprises an ad.

70. The medium of claim 67, generating the ordered set of rules comprises:

determining at least one significant correlation between a plurality of binary features of the training data and a plurality of activations of second item of the training data;

determining a second item and at least one binary feature providing a largest activation;

generating a rule based on the second item and the at least one binary feature providing the largest activation;

removing records from the training data matching the rule generated; and, repeating to generate another, lower-ordered rule while at least one significant correlation still exists.

71. A machine-readable medium having instructions stored thereon for execution by a processor to perform a method comprising:

determining at least one significant correlation between a plurality of binary features of training data and a plurality of activations of an item from training data;

determining an ad and at least one binary feature providing a largest activation, each rule accounting for at least a quota for the item;

generating a rule based on the ad and the at least one binary feature providing the largest activation;

removing records from the training data matching the rule generated; and, repeating to generate another, lower-ordered rule while at least one significant correlation still exists.

* * * * *